Jan. 13, 1948.  E. L. GINZTON  2,434,294
FREQUENCY CONTROL SYSTEM
Filed Oct. 22, 1943  4 Sheets-Sheet 1

INVENTOR
EDWARD L. GINZTON
BY
ATTORNEY

Jan. 13, 1948. E. L. GINZTON 2,434,294
FREQUENCY CONTROL SYSTEM
Filed Oct. 22, 1943 4 Sheets-Sheet 2

INVENTOR
EDWARD L. GINZTON
BY
ATTORNEY

Jan. 13, 1948.  E. L. GINZTON  2,434,294
FREQUENCY CONTROL SYSTEM
Filed Oct. 22, 1943    4 Sheets—Sheet 3

Fig. 17.

INVENTOR
EDWARD L. GINZTON
BY Paul B. Hunter
ATTORNEY

Jan. 13, 1948.  E. L. GINZTON  2,434,294
FREQUENCY CONTROL SYSTEM
Filed Oct. 22, 1943  4 Sheets-Sheet 4

INVENTOR
EDWARD L. GINZTON
BY
ATTORNEY

Patented Jan. 13, 1948

2,434,294

UNITED STATES PATENT OFFICE 2,434,294

FREQUENCY CONTROL SYSTEM

Edward L. Ginzton, Garden City, N. Y., assignor to Sperry Gyroscope Company, Inc., a corporation of New York Application October 22, 1943, Serial No. 507,235

18 Claims. (Cl. 250—36)

This invention relates to high frequency electrical apparatus and more particularly to automatic frequency control arrangements for such apparatus.

Pursuant to statutory requirements that the principle of the invention be explained in its best known mode of application, the invention will be described as applied to automatic control of the output frequency of a hollow resonator type ultra high frequency electron discharge device, but it will be understood that the invention is not so limited, as will be further apparent from the scope of the claims herein.

Considerable difficulty in the past has been experienced in accurately controlling the output frequency of hollow resonator and like ultra high frequency devices, especially, for one example, in a receiver where the device is an oscillator to be maintained at a desired frequency difference from a received ultra high frequency wave for producing a fixed intermediate frequency utilizable for indication and like purposes. Also, considerable difficulty has been experienced in obtaining automatic frequency control in radio object detecting receivers and the like having pulsed inputs, and the invention contemplates a practical solution of this problem.

This invention also relates to an important phase thereof to automatic frequency control systems for reliably obtaining desired correlation between a plurality of different associated frequencies.

As disclosed in United States Letters Patent No. 2,294,942, in which I am a co-inventer, automatic frequency control systems employing discriminator action have heretofore been proposed. In similar proposed systems employing frequency sensitive discriminators difficulty has often been encountered because the controlled oscillator at times may become stabilized at a frequency which is separated from the reference source frequency by other than the desired intermediate frequency, due to undesired discriminator action. The present invention is also concerned with elimination of such undesired discriminator action.

It is a major object of the invention to provide novel, simplified apparatus for attaining and maintaining reliable control over the output frequency of a high frequency source. Pursuant to this object, the source may be an ultra high frequency hollow resonator device.

A further object of the invention is to provide novel, simplified electrically energized apparatus for varying or "scanning" the output frequency of an ultra high frequency source, such as a hollow resonator device, cyclically over a predetermined range or band sweep, and for eventually maintaining said output frequency substantially constant or "floating" at or near a desired value within that range. Specifically pursuant to this object, the electrically energized apparatus may preferably actuate thermally responsive arrangements adapted for variation of the natural frequency of a hollow resonator device.

It is a further object of the invention to provide novel control arrangements for cyclically actuating the tuning mechanism of a hollow resonator device to repeatedly tune said device over a predetermined range of frequencies.

A further object of the invention is to provide a novel pulse responsive automatic frequency control system.

A further object of the invention is to provide an automatic frequency control system embodying a novel multivibrator or like saw-tooth wave generator arrangement for producing cyclically varying tuning control energization, and for maintaining a hollow resonator or like ultra high frequency device at or near a desired frequency condition.

A further object of the invention is to provide novel frequency control apparatus for a hollow resonator electron discharge device wherein an electro-mechanical tuning mechanism and an electron beam control electrode are actuated by control circuits having different time constants.

It is a further object of the invention to provide a novel automatic frequency control apparatus for a hollow resonator device wherein an electro-mechanical tuning mechanism and an electron beam control electrode are both responsive to the output of a multivibrator or like saw-tooth wave generator, thereby providing automatic frequency controls of different sensitivity. If the device is of the single resonator type, wherein an electron beam reflector returns the beam into the resonator, the control electrode is preferably the electron beam reflector.

It is a further object of the present invention to provide a novel automatic frequency control system wherein a plurality of source frequencies are maintained substantially at a predetermined frequency difference.

A further object of the invention is to provide novel main and auxiliary discriminator arrangements in an automatic frequency control system.

A further object of the invention is to provide a novel automatic frequency control system wherein the frequency of an oscillator or like source is controlled by novel discriminator arrangements.

It is a further object of the invention to provide improved apparatus in a fixed frequency difference system for preventing the controlled frequency from "locking-in" on the wrong side (for example, above instead of below) the reference frequency.

Further objects of the invention will presently appear as the description proceeds in connection with the appended claims and the annexed drawings wherein:

Ultra high frequencies, within the meaning herein employed, relate to frequencies in the order of $3 \times 10^8$ cycles per second or higher. Also the designation "hollow" resonator includes any cavity resonator wherein the interior is evacuated or contains any dielectric medium in gaseous, solid or liquid form.

Figure 1:
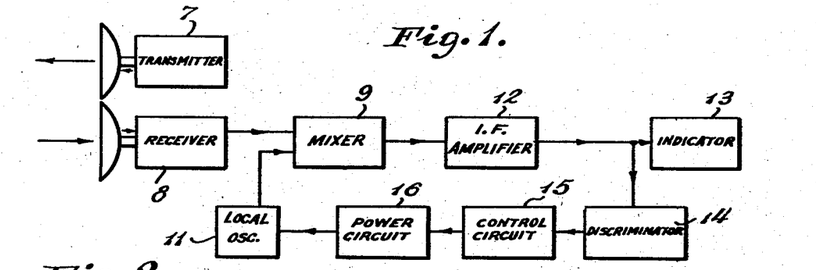
Figure 1 is a diagrammatic view illustrating a pulse transmitter and receiver system embodying a preferred form of the invention.

Figure 1 illustrates a pulse transmitting and receiving system such as is used for radio object detection and location, and embodying the invention. Pulses of ultra high frequency energy are sent out by a transmitter 7 and, after reflection from an object, are returned to receiver 8 wherein they are utilized to indicate the range, direction and character of the object.

The received pulses are ultra high frequency waves and are introduced into a mixer 9, along with ultra high frequency energy from a local oscillator 11. The intermediate frequency output of mixer 9 is then amplified at 12 and supplied to a suitable indicator circuit or device 13.

It is important to maintain a substantially fixed frequency difference between the received waves and the output of oscillator 11, so as to maintain the intermediate frequency output of mixer 9 substantially constant at a desired frequency value for utilization. Hence, in Figure 1, I provide an automatic frequency control for oscillator 11 which is responsive to variations in the intermediate frequency from that desired value, so that variations in both the received and oscillator frequency may be compensated for in the system by suitable regulation of oscillator 11.

To this end, part of the intermediate frequency output from amplifier 12 is introduced into a suitable frequency or phase sensitive discriminator 14 having an output polarized according to the direction of departure of the intermediate frequency from the desired constant frequency. Discriminator 14 may be tuned to the desired intermediate frequency output of mixer 9 or may for example be the same as that disclosed in United States Letters Patent No. 2,294,942.

Figure 2:
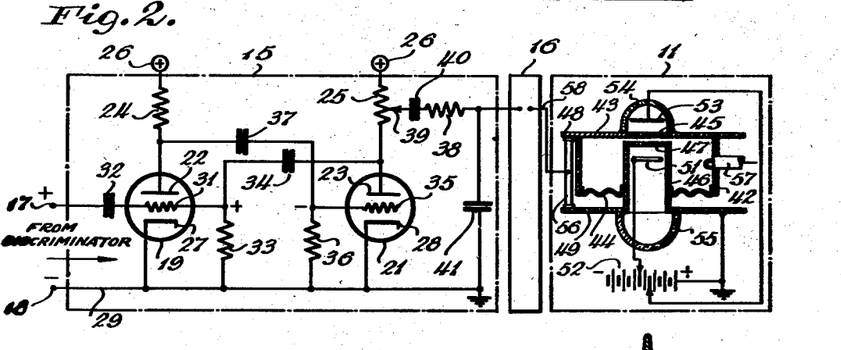
Figure 2 is a partly schematic view and wiring diagram illustrating a preferred multivibrator control circuit and local oscillator as embodied in the system of Figure 1.

The output of discriminator 14, amplified if necessary, is fed into a suitable control circuit 15, which latter forms a major part of the invention and is shown in detail in Fig. 2. Control circuit 15 is connected through a suitable power circuit 16 to effect frequency regulation of oscillator 11 as will be explained. Where the frequency of the transmitted and received pulses is controlled at the transmitter, the invention is chiefly accomplished by maintaining the output frequency of oscillator 11 substantially at a desired value.

Figure 2 illustrates details of control circuit 15 and the controlled local oscillator 11 employed in a preferred embodiment of the invention according to Fig. 1. Due to the pulsed nature of the wave received by receiver 8, the output of discriminator 14 will be in the form of pulses. The amplified pulsed output of discriminator 14 is connected across input terminals 17, 18 of control circuit 15 which is essentially a multivibrator circuit having special control features and novelty in the illustrated combination.

Control circuit 15 comprises a vacuum tube multivibrator circuit embodying two triodes 19 and 21 having their respective anodes 22 and 23 connected through respective resistors 24 and 25 to one terminal of a common unidirectional current source 26 whose other terminal is understood to be grounded. Cathodes 27 and 28 of the respective triodes 19 and 21 are connected to a common grounded lead 29 to which is also connected terminal 18. Terminal 17 is connected to grid 31 of triode 19 through a blocking or coupling condenser 32 which isolates the multivibrator circuit from the unidirectional output of the discriminator 14. Grid 31 is connected to ground lead 29 through a grid leak resistor 33, and to anode 23 of triode 21 through condenser 34. Grid 35 of triode 21 is connected to ground lead 29 through a grid leak resistor 36, and to anode 22 of triode 19 by condenser 37.

The output from the multivibrator circuit is derived from between a variable tap 39 on resistor 25 and ground, so that the output amplitude may be adjusted. Connected to these output leads is a series circuit comprising coupling condenser 40 and an R-C circuit comprising resistor 38 and condenser 41. The time constant of resistor 38 and condenser 41 may be selected to give desired control in the invention.

Oscillator 11 comprises a conventional type single hollow resonator device having a cylindrical reentrant hollow resonator 42 formed with a rigid wall 43 and a flexible annularly crimped wall 44 at opposite ends. Wall 43 is apertured for mounting an exit grid 45, and wall 44 is also apertured for receiving a hollow reentrant pole 46 carrying an entrance grid 47 parallel to grid 45 on its inner end. Annular flanged members 48 and 49 are rigid with wall 43 and pole 46.

A cathode 51, heated from a suitable source, is connected to the negative terminal of a unidirectional acceleration voltage source 52 having a grounded positive terminal, for projecting a stream of electrons through the oscillatory resonator field between grids 47 and 45. A reflector electrode 53, maintained at a slight negative or positive potential with respect to cathode 51, is located to return the electron beam into the space between resonator grids 45 and 47. Cathode 51, grids 45 and 47 and reflector 53 are all axially aligned in the device in the electron beam path. The parts are so dimensioned and energized that the electron beam excites and maintains ultra high frequency oscillations in the resonator, so that ultra high frequency energy may be available for extraction therefrom. Operation of such a hollow resonator device as an ultra high frequency generator is known and described in the United States Letters Patent No. 2,250,511, to which reference is hereby made for further detail.

Glass closure caps 54 and 55 seal off opposite ends of the resonator device so that the interior may be maintained evacuated. Concentric line 57 is provided for connecting resonator 42 to mixer 9 to supply high frequency energy thereto.

Tuning of oscillator 11 is accomplished in this embodiment by controlling the relative spacing of grids 45 and 47. A rigid strut 56 extends between flanges 48 and 49. Strut 56 is preferably a thin-walled hollow tube of duralumin or some material having a relatively high coefficient of thermal expansion.

Looking into the output of control circuit 15, a high impedance is observed, while strut 56 on the other hand is obviously of a relatively low impedance. Moreover, the output power of the multivibrator circuit may not be sufficiently large to provide the power required for energization of strut 56. The purpose of power circuit 16 is to convert the variable output of control circuit 15 into a similarly, preferably identically, varying high power output for energizing strut 56.

Preferably power circuit 16 is a conventional oscillator system, the output of which varies identically with the voltage across condenser 41, and which supplies enough power for suitably heating the strut. Since the details of such oscillator are not part of the present invention, further description thereof is not necessary. Such a power circuit is shown, for example, in Fig. 8 of application Serial No. 486,589, filed May 11, 1943, in the name of H. M. Stearns. Condenser 40 is provided where necessary to keep direct current from power circuit 16 from affecting operation of control circuit 15.

As shown in Figure 2, the output of control circuit 15 derived across condenser 41 is connected to control operation of the oscillator power circuit 16, whose output lead 58 feeds power to strut 56. According to the invention the power delivered over lead 58 varies exactly with the cyclically varying output voltage of circuit 15 derived from condenser 41.

Output lead 58 from power circuit 16 is preferably connected to the midpoint of strut 56, so that both halves of strut 56 are electrically in parallel, flanges 48 and 49 being directly connected by the metallic shell of resonator 42 and grounded. If desired, however, strut 56 may be heated by a separate heater coil therewithin, or in any other desired manner.

Strut 56 expands in length substantially in proportion to the output of power circuit 16, which follows the current strength of the multivibrator output, thereby correspondingly varying the spacing of grids 45 and 47 and the natural frequency of the oscillatory circuit within resonator 42, for purposes to be explained.

Operation

The system of Figure 1 is energized and each element rendered operable. If the intermediate frequency from amplifier 12 is at the desired constant value, or is outside the frequency range to which discriminator 14 is responsive, there is no control signal from discriminator 14 and the output frequency of resonator 42 is variably controlled by the multivibrator circuit alone.

Figures 3, 4, 5 and 6 illustrate the operation of the multivibrator utilized in my invention, which may be suitably energized by connection to source 26. The multivibrator circuit will initially be in a state of unbalance with either grid 31 or 35 more positive, since the circuit is inherently unstable, as is known.

Assume that for some reason, grid 31 of triode 19 is initially made more positive than grid 35 of triode 21 in any desired manner, as indicated in Fig. 2. The plate current of triode 19 is thereby increased, lowering the plate voltage and causing grid 35 of triode 21 to become more negative. The plate current of triode 21 is thereby decreased, raising the plate voltage thereof to make grid 31 more positive. The above continues until within a very short space of time grid 35 is so highly negatively charged as to block triode 21, triode 19 being then at maximum conductivity. This is the condition represented at the left end of Figures 3 and 4 showing the variation of anode current for triodes 19 and 21 respectively, the condition prevailing for the period indicated as $t_1$.

During the period $t_1$, however, the high negative charge on grid 35 leaks off through grid leak resistor 36, and eventually grid 35 becomes more positive than cut-off and starts to conduct. An increase in conductivity of triode 21 makes grid 31 more negative and reduces the conductivity of triode 19. This reverse action now continues until triode 19 becomes blocked and triode 21 is fully conducting, a condition prevailing during the period $t_2$ in Figs. 3 and 4.

Figures 3, 4, 5, 6, 8:
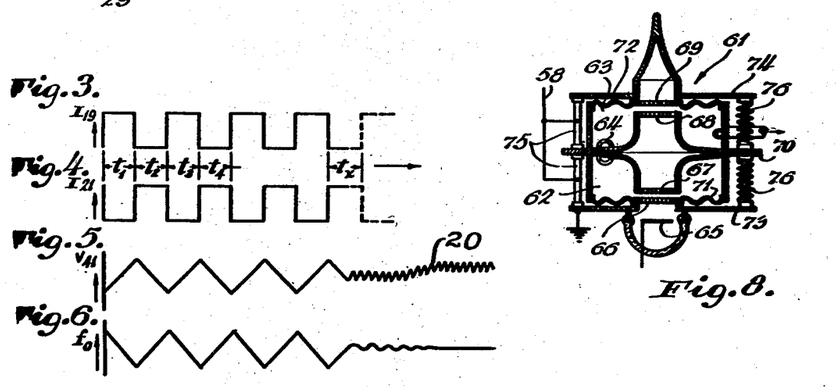
Figures 3-6, inclusive, are diagrammatic illustrations for explaining operation of the control circuit of Figures 1 and 2 and its scanning function.
Figure 8 is a sectional view illustrating a multiple hollow resonator device optionally controllable by the circuit of Figure 1.

The above is repeated cyclically, and triodes 19 and 21 become alternately conductive and nonconductive as illustrated at periods $t_3$, $t_4$, etc., in Figures 3 and 4. The speeds of these cyclic operations and the lengths of periods $t_1$, $t_2$, etc., are determined by the values assigned to grid condensers 34 and 37, and grid leak resistors 33 and 36. Preferably the periods are made about equal for purposes of the invention, for uniform scanning control. The above described multivibrator action follows accepted theories of operation of such circuits. The output between tap 39 and ground is of square wave form, and filter circuit 38, 41 is employed to integrate the square wave output and obtain the cyclically varying control voltage output shown in Figure 5.

Energy from source 26 is effective to charge condenser 41 during the periods $t_1$, $t_3$, etc., when triode 21 is blocked; and condenser 41 discharges during the periods $t_2$, $t_4$, etc., when triode 21 is conductive. Figure 5 illustrates the resultant cyclic variations in voltage $V_{41}$ across condenser 41, and therefore also illustrates the resultant variations in power output of power circuit 16.

The cyclic output voltage of condenser 41 controls alternate heating and cooling of strut 56, although the thermal inertia of strut 56 may cause the resultant elongation and contracting of strut 56 to slightly lag the condenser voltage variation.

As strut 56 alternately elongates and contracts, it correspondingly varies the spacing of grids 45 and 47 and the output frequency of resonator 42. The output frequency of resonator 42 increases when grids 45 and 47 are moved apart by elongation of strut 56, and decreases when the grid spacing is reduced by contraction of strut 56. The limits of $V_{41}$ are so chosen that resonator 42 is repeatedly automatically tuned back and forth over substantially its entire operable frequency range. This tuning operation is also known as scanning of the resonator frequency range, and as pointed out above, takes place uniformly in the absence of any signal from discriminator 14. An important feature of this scanning control is that the cyclically varying voltage output from condenser 41 causes positive similar cyclical variation in the heating power applied to strut 56, so that the resonator frequency is under positive control during the entire scanning time.

Hence, uniform scanning is immediately originated when the system of Figure 1 is energized, and continues until modified by the introduction of a discriminator output signal on terminals 17, 18, as will appear.

During scanning, the output frequency $f_0$ of resonator 42 decreases during periods $t_1$, $t_3$, etc., when condenser 41 is charging and the energization of strut 56 is decreasing, permitting strut 56 to cool to reduce the scanning between grids 45 and 47, and increases during periods $t_2$, $t_4$, etc., when condenser 41 is discharging and strut 56 is increasingly energized to elongate to increase the grid spacing. Figure 6 illustrates, at the left side, the manner in which the resonator output frequency $f_0$ varies theoretically during scanning, although actually it may lag somewhat due to thermal inertia of strut 56. In any event, however, the frequency variation is cyclic and regular during scanning.

Figure 7:
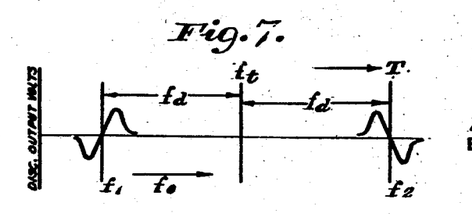
Figure 7 illustrates diagrammatically discriminator output response corresponding to changes in local oscillator frequency in the system of Figure 1.

Assume now that the output frequency of resonator 42 is such that the intermediate frequency output of amplifier 12 comes within the discriminator response range, for producing a unidirectional control signal across terminals 17, 18. Referring to Figure 7, which illustrates the response of discriminator 14 to changes in frequency of oscillator 11, it is noted that there are two values of local oscillator frequency $f_0$ which may combine with the transmitter frequency $f_t$ to produce the desired intermediate frequency $f_d$. The discriminator response at the lower of these two oscillator frequencies $f_1$ is the mirror image of the discriminator response at the upper oscillator frequency $f_2$. This is because the intermediate frequency varies in the same direction as the oscillator frequency for values of $f_0$ above $f_t$, and varies oppositely to the oscillator frequency for values of $f_0$ below $f_t$.

The polarity of output of discriminator 14 may be reversed by reversing the output leads as is known. In the described arrangement, the discriminator output is selected polarized as shown in Figure 7 for the operation to be described.

Assume now a time $t_x$ when the multivibrator scanning action is increasing $f_0$ from appreciably below $f_1$. As shown in Figure 5, during this period $t_x$, condenser 41 is discharging to cause power circuit 16 to increasingly energize strut 56. When $f_0$ becomes such that the intermediate frequency enters the range of discriminator 14, a negative signal from the discriminator is impressed on grid 31. This signal is of course made up of a succession of pulses which may or may not be regular or periodic, but which are sufficiently close together to afford control action.

Now, during the period $f_0$ is increasing, tube 19 is non-conductive, with grid 31 already highly negative. This means that the negative discriminator signal has no effect on the multivibrator scanning action.

However, when $f_0$ increases beyond $f_1$, the discriminator output reverses in polarity and a positive signal from the discriminator is impressed on grid 31. This signal comprises a succession of positive pulses. As soon as a positive pulse of sufficient amplitude is delivered to grid 31, the above described multivibrator scanning action is interrupted and modified. The positive discriminator output pulse renders grid 31 positive so that triode 19 becomes conductive. As a result, triode 21 becomes blocked, and discharge of condenser 41 is interrupted to thereby cause power circuit 16 to reduce energization of strut 56.

The increase in oscillator frequency $f_0$ is therefore halted just above $f_1$, and the above described premature forced reversal of the multivibrator circuit causes the oscillator frequency to now start decreasing. The decreasing oscillator frequency soon drops below $f_1$, at which time the discriminator output reverses to negative. As soon as a negative pulse of sufficient amplitude is delivered to grid 31, triode 19 is again blocked. As a result triode 21 becomes again conductive, and charging of condenser 41 is interrupted to thereby cause power circuit 16 to increase energization of strut 56. Decrease in the oscillator frequency is thereby halted, and increase in oscillator frequency again started.

The output of discriminator 14 thus modifies the multivibrator scanning action. The fact that the discriminator output is pulsed aids automatic frequency control, because the multivibrator circuit is of such nature that a signal of pulse duration only, of the proper polarity and amplitude, is sufficient to trigger the above-described reversals in operation. Moreover, no periodicity or regularity of the pulses is necessary.

As shown at the right end of Figure 5, the above-described discriminator action causes the voltage across condenser 41 to fluctuate or float closely about a medial value determined by the discriminator operation. The power output of power circuit 16 follows these voltage fluctuations. As a result, it is clear that the discriminator output exerts very close positive control and substantial stabilization of the resonator output frequency, and consequently the intermediate frequency. The frequency response of the illustrated resonator device is, as pointed out above, subject to thermal inertia so that as a practical matter the resonator frequency does not fluctuate as sharply or to the same degree as the control power as indicated at the right in Figure 6. In effect, the discriminator action maintains the resonator output frequency substantially floating about a frequency selected for producing the desired intermediate frequency within permissible limits, so that the single control circuit 15 automatically maintains a substantially constant intermediate frequency $f_d$ for utilization as at indicator 13.

When the frequency of resonator 42 has a tendency to drift during operation, as, for example, when the resonator frequency decreases as the resonator walls become heated, the average control voltage $V_{41}$ changes slightly as shown at the right end 20 of Figure 5 to maintain the resonator output frequency at the desired level to produce the required intermediate frequency.

The problem of preventing lock-in of the oscillator at a frequency different from that required to produce the desired intermediate frequency will later be considered.

While I have described control circuit 16 as actuating a thermal strut, it is within the scope of the invention to substitute for strut 56 any electro-mechanical device such as a motor, piezo-electric member, or magnetostrictive member suitably connected to flanges 48 and 49.

Furthermore, while the invention is above described as adapted for maintaining a desired intermediate frequency in the illustrated system, it is obviously equally well adapted for maintaining the output frequency of any device, such as hollow resonator 42, substantially fixed. For example, any constant controlled frequency source could be utilized in place of receiver 8, as will be explained in connection with Figure 10, or an arrangement similar to Figure 11 may be employed. Resistor 38 and condenser 41 comprise a relatively long time constant filter circuit for integrating the normally substantially square wave output of the multivibrator circuit. If desired, for some installations as where the thermal inertia of strut 56 is high, this filter may be eliminated to provide direct actuation of the power circuit by the multivibrator.

As pointed out above, the output of discriminator 14 is pulsed because the received waves are pulsed. Far from interfering with the above described operation, this pulsed input may be considered as very useful to the above described cyclic control of the multivibrator circuit. As above explained, the oppositely polarized pulses in the discriminator output positively tend to drive the oscillator frequency back and forth cyclically within limits which may be determined by suitable circuit constants.

*Further embodiments*

Figure 8 illustrates a multiple hollow resonator device 61 which may be employed as the oscillator 11 in Figure 1. Device 61 comprises a pair of hollow resonators 62 and 63, adapted to contain oscillating electromagnetic fields which are coupled together by loop 64. A cathode 65 is provided to project an electron beam through spaced input grids 66, 67 in the walls of resonator 62, and spaced output grids 68, 69, in the walls of resonator 63.

Grids 66 and 69 are flexibly connected to the resonator body, as by flexible resonator end walls 71 and 72, and are rigid with radial flanges 73 and 74. Flexible ribbons or wires 75, of some conductive material having a high coefficient of thermal expansion, are secured at opposite ends to a flange 70 rigid with the resonator and to flanges 73 and 74. Suitable compression springs 76 maintain wires 75 under tension.

Lead 58 in Figure 1 is connected to the midpoints of wires 75, for accomplishing automatic frequency control similar to Figure 1 above described. Otherwise, the operation of device 61 as an oscillator is conventional, and similar to that described in United States Letters Patent No. 2,242,275. Strut 56 or wires 75 may be interchangeably used in the structures of Figures 2, 8 and 9. Care only is needed to correlate the control action with the relation between the expanding strut or wire and frequency.

Figure 9:
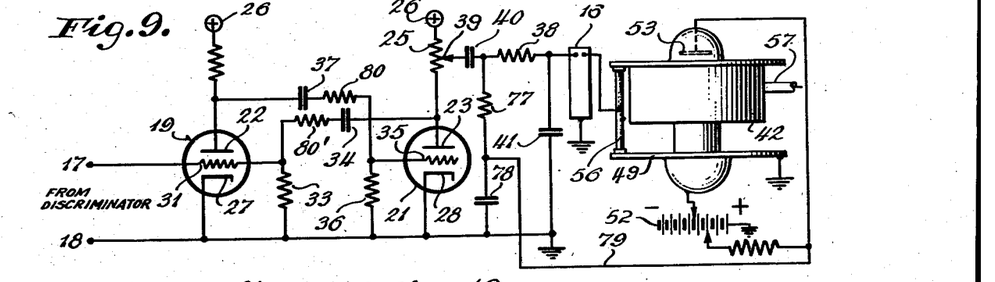
Figure 9 is a partly diagrammatic view and wiring diagram illustrating a further embodiment of the invention, substantially adding a short time constant automatic frequency control to the arrangement of Figure 1.

Figure 9 illustrates an automatic frequency control circuit which is similar to Figure 1, but includes also a relatively fast automatic electrical tuning control synchronized with the electromechanical tuning control. As in Figure 1, the output of condenser 41 supplies cyclic energization of strut 56. Due to thermal inertia of the strut, circuit elements 38, 41, as above pointed out, necessarily are selected to have a relatively long time constant, so that the strut may be properly and efficiently energized for maximum control. As in Figure 1, the power output of the control circuit may be stepped up by use of a power circuit similar to that at 16 in Figure 1.

For correlated auxiliary automatic frequency control, I provide relatively small time constant circuit elements comprising series connected resistance 77 and condenser 78 arranged in parallel with elements 38, 41 across the output of triode 21. A lead 79 is connected to reflector electrode 53 so that the potential of reflector electrode 53 varies cyclically in exact periodic synchronism with the control action illustrated in Figure 5, but at a faster control rate since there is no thermal inertia to overcome. Since variation in the potential of reflector 53 alone may control the resonator frequency as known, it is apparent that automatic frequency control obtained by the combined arrangement of Figure 9 is rendered immediately effective due to the short time constant circuit elements, and positively and accurately regulated by the long time constant circuit elements 38, 41 which determine the periodicity of the scanning operation and take care of large frequency changes. The multivibrator circuit in Figure 9 differs from that of Figure 1 also by the inclusion of grid resistors 80 and 80' in series with condensers 34 and 37 respectively, for reducing the negative grid swing for each triode and thereby speeding up tripping of the multivibrator. This phase of the invention, wherein long and short time constant controls are employed for electro-mechanical and electric tuning members respectively, is of course not limited to automatic frequency control, but may be embodied in a manually controlled frequency regulation system as where the two R—C circuits 38, 41 and 77, 78 are connected across a manually variable power source.

Figure 10:
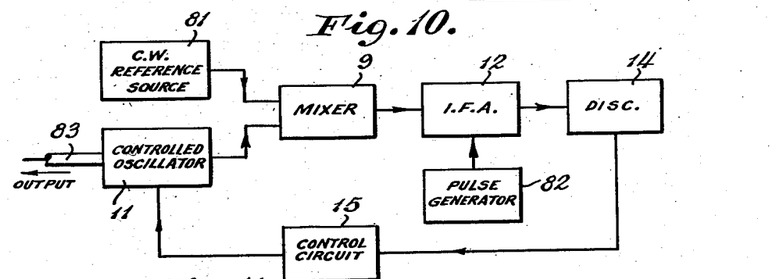
Figure 10 illustrates diagrammatically an automatic frequency control system according to the invention, but having a continuous wave input.

Figure 10 illustrates an automatic frequency control system according to the invention, wherein a continuous wave reference source is provided at 81 for producing a constant ultra high frequency input to mixer 9. Discriminator 14 and control circuit 15 are the same as in Figure 1 or 9. In order to provide pulses for operation of the multivibrator circuit as above explained, I connect a suitable pulse generator 82 to amplifier 12, but any equivalent manner of obtaining a pulsed discriminator output lies within the scope of the invention. The useful output from oscillator 11 is extracted by a coaxial conductor or a wave guide indicated at 83.

Figure 11:
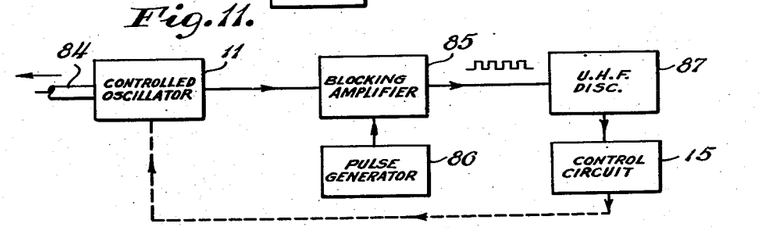
Figure 11 is a diagrammatic view illustrating a further embodiment of the invention in an ultra high frequency control circuit.

Figure 11 illustrates a further system embodying the invention wherein the output frequency of ultra high frequency oscillator 11 is directly controlled through external apparatus suitably connected thereto. Oscillator 11 is provided with a suitable concentric line 84 for extracting energy at the controlled frequency for any desired utilization.

Output energy from oscillator 11 is introduced into a blocking amplifier 85 to which is connected a pulse generator 86. Amplifier 85 and pulse generator 86 may be of any conventional type, and the chief purpose of their association herein is to pulse the output of oscillator 11 prior to input to an ultra high frequency discriminator 87 connected to amplifier 85. Obviously any equivalent arrangement for producing a pulsed output from oscillator 11 may be employed. Control circuit 15 is connected to receive the output of discriminator 87 and to effect frequency control of oscillator 11, similarly to Figure 1 or 9.

The dotted line in Figure 11 indicates any suitable electrical or mechanical control link between the control circuit 15 and oscillator 11. It may comprise frequency control by motor driven tuning device as in Patent No. 2,294,942, or by the above methods described in Figs. 1 and 9.

Figure 12:
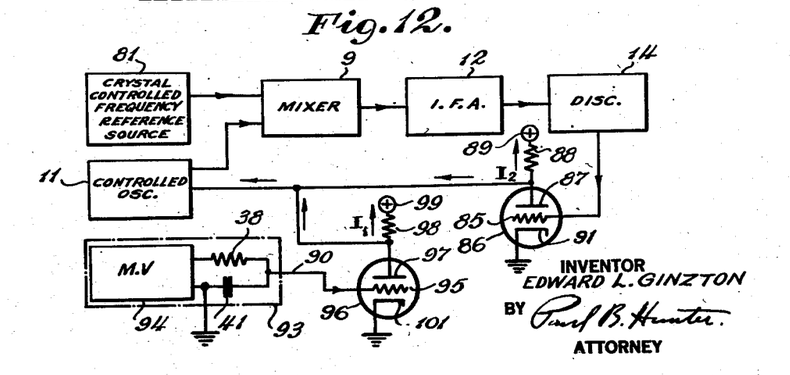
Figure 12 is a partial block and wiring diagram illustrating an automatic frequency control with multivibrator scanning but not requiring pulsed operation.

In the above described embodiments of the invention automatic frequency control is attained by connecting the discriminator to modify the scanning operation of the multivibrator circuit. Figure 12 illustrates a system wherein the multivibrator circuit at all times tends to exercise frequency range scanning and wherein the discriminator is connected in parallel with the output of the multivibrator circuit so as to modify scanning and maintain substantially a desired intermediate frequency during periods when the discriminator is energized.

Referring now to Figure 12, crystal controlled ultra high frequency source 81 and the controlled oscillator 11 are connected to mixer 9, and the intermediate frequency output of mixer 9 is amplified at 12 and introduced into discriminator 14, similarly to Figure 1. Source 81 may be of relatively low power as compared to oscillator 11, and may be of a known type accurately maintained at a selected frequency, for example, by suitable crystal control and a frequency multiplier chain.

The polarized output of discriminator 14 is connected to grid 85 of an amplifier 86, having its anode 87 connected through a suitable output resistor 88 to a source 89, and having a grounded cathode 91. Anode 87 is also connected to energize the frequency control member of the controlled oscillator, as for example, a thermal tuning strut such as 56 in Figure 1.

A suitable scanning control circuit 93 containing a multivibrator circuit 94 similar to that described in Figure 2 is also provided with an output resistor 38 and condenser 41 as in Figure 2. Lead 90 from the multivibrator output is here connected to the grid 95 of a triode 96 having its anode 97 connected through resistor 98 to a suitable power source 99, and having a grounded cathode 101. Anode 97 is connected to the frequency control member of oscillator 11 along with the discriminator output. It will be noted that the discriminator output is here not fed into the multivibrator circuit as in Figure 2, and hence does not modify operation of the multivibrator circuit, but is used to modify the multivibrator output. Arrow $I_1$ indicates control current due to the scanning control circuit, and arrow $I_2$ indicates control current due to discriminator action, while the other arrows indicate direction of flow of the control influences.

Figures 13, 14, 15, 16, 17:
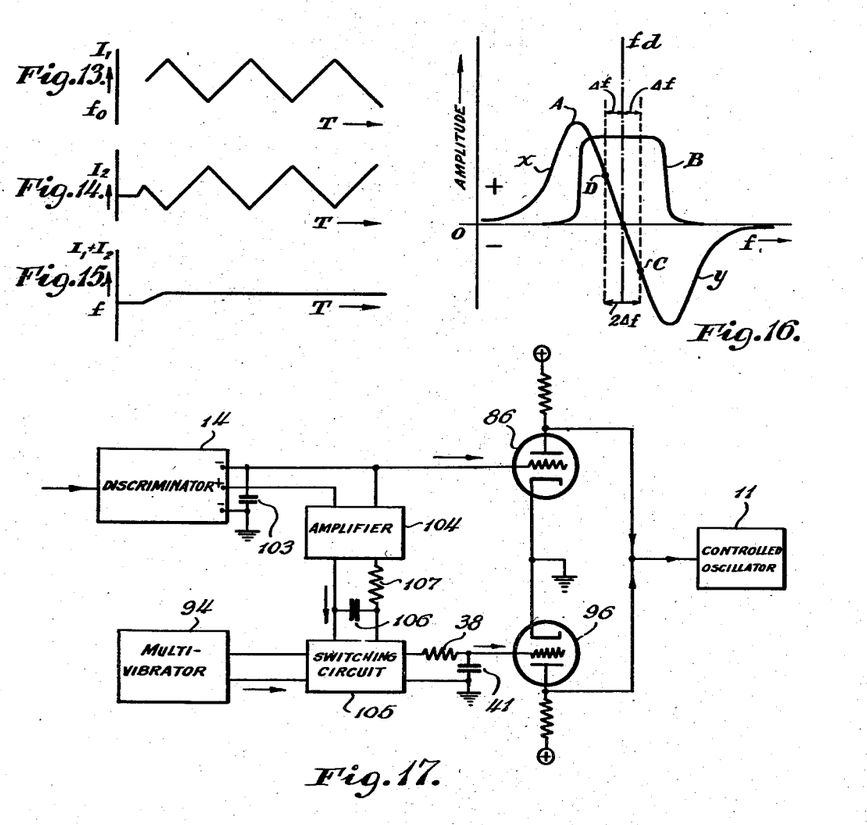
Figures 13-16 are graphs illustrating operation of the system of Figure 12.
Figure 17 is a partial diagrammatic view illustrating a further embodiment of the system of Figure 12.

In operation, upon energization, control circuit 93, through the multivibrator action above described, produces control current $I_1$, which tends to vary cyclically, as shown in Figure 13, between selected limits, so as to cause similar cyclic variations in the output frequency $f_o$ of oscillator 11 as indicated. This operation initiates scanning of oscillator frequency range and would continue indefinitely were it not for the below described control action immediately exercised by discriminator 14.

As current $I_1$ increases, this tends to increase the oscillator frequency, and consequently the intermediate difference frequency. Figure 16 illustrates the frequency response curve A of discriminator 14 and shows that the discriminator output reverses in polarity as the intermediate frequency increases through the desired frequency $f_d$. Figure 14 represents current $I_2$ produced by discriminator action. Current $I_2$, being produced by changes in frequency $f_d$ caused by variations of $I_1$, has the same periodicity as $I_1$, but is opposite in direction because of the inverse discriminator response. Discriminator 14 is tuned to desired frequency $f_d$, which is the mid-frequency region of the frequency response of amplifier 12 represented by curve B.

The slope of curve A passing through $f_d$ is so chosen that variation in the intermediate frequency near frequency $f_d$ and over the relatively small frequency range $2\Delta f$ will produce a relatively large change C—D in amplitude in the discriminator output. The slope of curve A at C—D can be made as sharp as desired by suitable amplification of the discriminator output, and the circuit elements are so designed that a change in scanning current $I_1$, which produces a correspondingly small change in intermediate frequency, will cause a proportionately large discriminator output change and a control current $I_2$ of opposite sense than and substantially equal amplitude with current $I_1$.

Thus, as variation in scanning current $I_1$ tends to cause the frequency of oscillator to sweep in either direction, opposing current $I_2$ produced by the resultant strong discriminator output quickly halts that frequency sweep after only a small change in frequency. The output frequency $f_o$ of oscillator 11, and hence the intermediate frequency, thus float between relatively narrow limits. The average intermediate frequency is, of course $f_d$.

In the invention, the circuit constants are such that the intermediate frequency is theoretically maintained floating about $f_d$ between the limits $f \pm \Delta f$ on either side. Actually a more nearly constant $f_d$ is maintained because of thermal and other inertia in circuit elements such as strut 56.

By tuning discriminator 14 to the desired intermediate frequency $f_d$, I insure that the control action takes place uniformly about the frequency $f_d$. The control action does not tend to take place at frequencies corresponding to slopes of the discriminator response curve indicated at $x$ and $y$ because, as shown in Figure 16, the discriminator output then produces a current $I_2$, which is in the same sense as $I_1$, and actually speeds up the frequency sweep toward the control region C—D.

Should the reference or oscillator frequencies so change that no discriminator output is available, or if for any other reason there is no discriminator output, the multivibrator circuit continues scanning control. Obviously any tendency for the oscillator or reference frequencies to drift, when the discriminator is exercising control, is compensated for automatically.

Figure 17 illustrates certain refinements on the system of Figure 12, which may be used if desired. The usual three terminal frequency sensitive discriminator output is illustrated in Figure 17 as bridged by a large condenser 103. This condenser is used only when discriminator 14 is connected to a pulsed input such as receiver 8 of Figure 1, and serves to eliminate pulses from the utilized discriminator output.

In addition Figure 17 illustrates a further auxiliary control by which the output of discriminator 14, amplified at 104, is employed to control a switching circuit 105 in the multivibrator output. This auxiliary control renders the multivibrator output inoperable to control scanning; that is, current $I_1$ is reduced to zero whenever a control current $I_2$ appears in the discriminator output. A filter comprising condenser 106 and resistor 107 is inserted in this auxiliary control circuit, and is of sufficient time constant to prevent undesired actuation of the switching circuit by random fluctuations in the discriminator output currents.

When the discriminator output switches off the scanning current $I_1$, the discriminator alone then functions to control the resonator frequency. Whenever the resonator frequency then produces an intermediate frequency outside the discriminator range so that the auxiliary switching circuit is deenergized, the multivibrator circuit resumes scanning action to bring the resonator frequency back within the control range of the discriminator. Any of the features above described with reference to Figures 9, 12 and 17 may be interchangeably used between the systems of Figures 1, 9 and 12.

Lock-in control

In the phase of the invention illustrated in Figures 18–21, the frequency of an oscillator or like source is maintained at a substantially fixed intermediate or difference frequency on a desired side of the frequency of a reference source. The invention is especially adaptable to the automatic frequency control of ultra high frequency devices of the hollow resonator type, as will appear. The terms "source" as used herein is relative, and is not limited to generator or like original sources.

Figure 18:
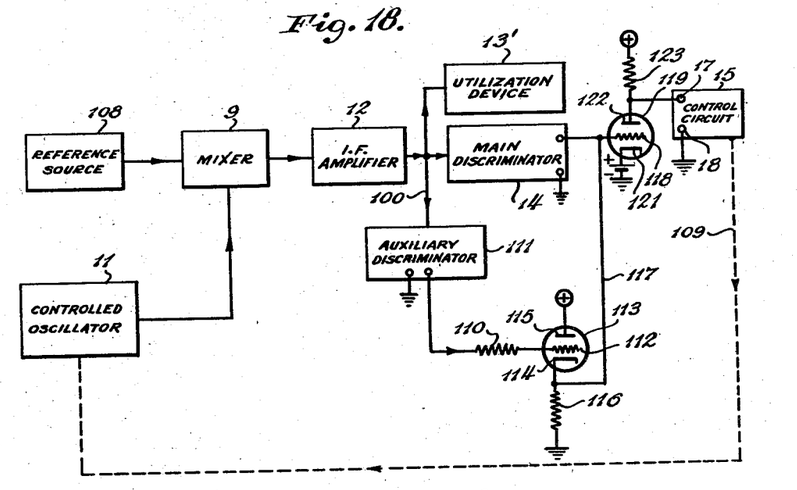
Figure 18 is a partially diagrammatic illustration of a further embodiment of my automatic frequency control invention.

Referring to Figure 18, which shows this phase of the invention as applied to systems similar to those of Figures 1–17, energy from a reference source 108 and controlled oscillator source 11 is introduced into mixer 9, which may be the same as the mixer-detector disclosed in Patent No. 2,294,942. Reference source 108 may be of any suitable type for producing a relatively stable reference frequency. For example, it may comprise a relatively low power crystal controlled ultra high frequency oscillator, or it may be the receiver of a reflected-energy object detecting and locating system utilizing the reference source as a transmitter oscillator. Also, the reference source may be a received wave, and the controlled oscillator may then be the local oscillator of a superheterodyne receiving system.

Source 11 is designated the controlled source because it is provided with arrangements as in Figure 1 for varying its operating or output frequency.

The output frequency of source 11 is selected to be near the reference frequency, being separated therefrom by the difference frequency appearing in the output of mixer 9. It is this difference frequency, which is known also as the intermediate frequency, that is utilized for indicator, control and like purposes in the system. Mixer 9 may therefore be regarded as the source of difference frequency. The invention maintains this difference frequency substantially at a desired value, regardless of deviations in either the reference or controlled oscillator frequencies.

The difference frequency output of mixer 9 is amplified at 12, and part of the output of amplifier 12 is introduced into a main discriminator 14. Discriminator 14 is preferably of the frequency sensitive type indicated in Figure 1 having circuits tuned to a selected frequency, in this case the difference frequency which is desired to be maintained constant, and producing output unidirectional voltage control signals polarized according to direction of departure of the difference frequency from the desired constant value.

The output of discriminator 14 is introduced into a suitable control circuit 15 such as that of Figure 2 operatively connected, as indicated by dotted line 109, to the frequency regulation mechanism in controlled oscillator 11. Dotted line 109 represents any suitable electrical or electromechanical connection between control circuit 15 and the tuning or frequency regulating mechanism for oscillator 11.

The invention contemplates a refinement of control by the use of an auxiliary discriminator or equivalently functioning arrangement which is so cooperatively associated with any of the above described systems as to provide an efficient and practical frequency control.

In the embodiment illustrated in Figure 18, a part of the difference frequency output of amplifier 12 is introduced into auxiliary discriminator 111, which may be the same as discriminator 14. Discriminators 14 and 111 may be any conventional frequency sensitive discriminators such as is used for example in known frequency modulation receivers. Alternatively, auxiliary discriminator 111 may be any type of circuit whose output varies with frequency. One alternative form will be described below with respect to Figure 21.

The output of auxiliary discriminator 111 passes through series resistor 110 and is impressed on the control grid 112 of a triode 113 having a suitable energized cathode 114 and an anode 115. A suitable resistor 116 is disposed in the cathode circuit so that triode 113 acts as a cathode follower. A lead 117 connects resistor 116 to the grid 118 of a triode 119 situated between main discriminator 14 and control circuit 15.

Triode 119 is provided with a suitably biased cathode 121, an anode 122 and a load resistor 123. Input terminals 17, 18 of control circuit 15 are connected across the output of triode 121.

The purpose of these arrangements in contributing to automatic frequency control, will be explained below.

In operation, the auxiliary discriminator primarily functions to prevent stabilization of the system when the reference and controlled source frequencies are separated by other than the desired intermediate frequency. The following discussion of the action of main discriminator 14 and the control problems present therein will aid in understanding the invention.

Figures 19, 20, 21:
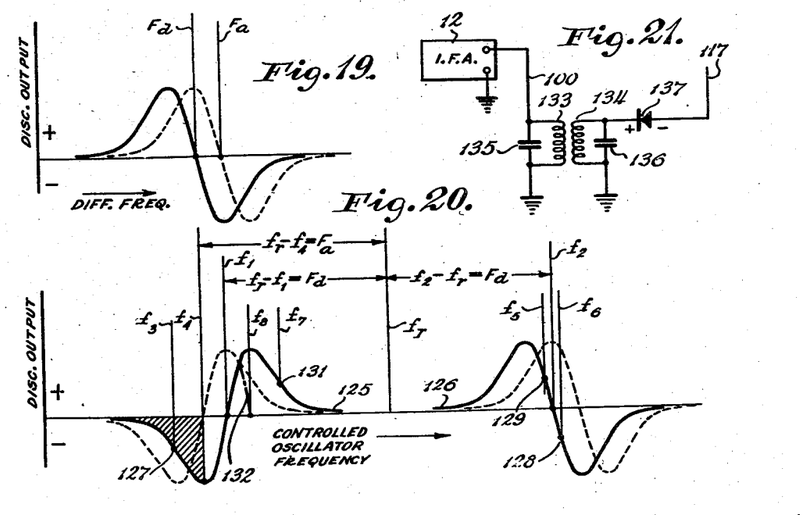
Figure 19 is a graphic illustration of the main and auxiliary discriminator response characteristics employed in explanation of the frequency control exercised by the invention of Figure 18.
Figure 20 is a further explanatory graph illustrating the nature of the frequency control of the invention of Figure 18.
Figure 21 is a diagrammatic view illustrating a control circuit similar to that of Figure 18 but employing a simple tuned circuit instead of an auxiliary discriminator for controlling operation of the main discriminator.

Referring to Figure 19 in which the solid line curve illustrates the frequency response of main discriminator 14, it will be observed that discriminator 14 produces zero output at the desired difference frequency $F_d$; and that the output of discriminator 14 is positive when the difference frequency is below $F_d$, and negative when the difference frequency is above $F_d$. For purposes of explanation, also it will be assumed that when the output of discriminator 14 is positive, the operating frequency of oscillator 11 is caused to increase, and when the output of discriminator 14 is negative, the operating frequency of oscillator 11 is caused to decrease, by reason of the discriminator control action effective through circuit 15.

In Figure 20, curves 125 and 126 show the effective response of main discriminator 14 over a controlled oscillator frequency range including the reference source frequency $f_r$ and frequencies $f_1$ and $f_2$ at either of which latter oscillator 11 may become stabilized for producing the desired difference frequency. When the frequency of oscillator 11 is below $f_r$, an increase in the oscillator frequency causes a decrease in the resultant difference frequency. Hence curve 125 is the reverse of the solid line curve of Figure 19. When the frequency of oscillator 11 is above $f_r$, an increase in the oscillator frequency causes an increase in the resultant difference frequency. Hence curve 126 is similar to the solid line curve of Figure 19. Curves 125 and 126 are mirror images of each other, the axis of symmetry being frequency $f_r$.

Consider first the condition that, when operation is initiated, the frequency of oscillator 11 is appreciably below $f_1$ and increasing either from drift or by the scanning action described above with reference to Figures 1–17. This means that the difference frequency is initially very high and is decreasing. Referring to Figure 20, as the increasing oscillator frequency causes the decreasing difference frequency to enter the discriminator response region, a negative output is first put forth by discriminator 14. But as above specified, a negative output from discriminator 14 results in a tendency to decrease the oscillator frequency. As a consequence, unless corrective measures are taken, the increasing operating frequency of oscillator 12 is halted as soon as the negative discriminator output becomes sufficiently strong, as for example when it reaches the point indicated arbitrarily at 127. The oscillator frequency is therefore prevented from rising above a frequency $f_3$, and the above rebuffing action takes place every time either scanning action or drift tend to so increase the oscillator frequency. As a result, the oscillator frequency will tend to seek some relatively fixed level at or below $f_3$, and the desired difference frequency is unobtainable.

Before discussing corrective measures for the above difficulty, further possible control action of discriminator 14 will be considered to ascertain if any further similar difficulties are encountered.

Should the increasing oscillator frequency reach and pass frequency $f_4$ without being halted, frequency $f_4$ representing maximum negative output of discriminator 14, the output of discriminator 14 becomes less negative, thereby lessening any tendency of the discriminator output to oppose increase of oscillator frequency. Eventually the oscillator frequency increases above $f_1$ so that the main discriminator output actually becomes positive, which is effective to increase the oscillator frequency. Thus, after the oscillator frequency increases above $f_4$, discriminator 14 exercises no tendency to halt such increase below $f_r$, at which the difference frequency is zero.

As the oscillator frequency increases above $f_r$, the resultant difference frequency now increases, and a positive output from discriminator 14 is first encountered when the increasing difference frequency enters the discriminator response band represented by curve 126. This is effective only to further increase the oscillator frequency. However, as the increasing oscillator frequency goes above $f_2$, the output of discriminator 14 now reverses to negative and is effective to cause a decrease in the tendency of the oscillator frequency to increase. When the negative discriminator output becomes sufficiently strong, as at point 128, the tendency to drift is completely cancelled and the frequency remains substantially constant at $f_6$. If the tendency to drift reverses, then, as soon as the now decreasing oscillator frequency passes below $f_2$, the discriminator output again reverses to positive and is effective to oppose the tendency in the oscillator frequency to decrease. When the discriminator output becomes sufficiently strong, as at point 129, the tendency to increase is completely cancelled, and the frequency remains constant at $f_5$. The frequency of oscillator 11 is thus always maintained between limits $f_5$ and $f_6$ so as to be substantially at or near $f_2$, thus maintaining the resultant difference frequency at or near the desired value. By suitable design of the control circuits, to provide a large frequency-correction for small discriminator outputs, these limits may be held very close, and the frequency is maintained substantially constant for all practical purposes.

Consider, secondly, the opposite condition that when operation is initiated, the oscillator frequency is appreciably higher than $f_2$ and decreasing either by drift or by scanning action. This means that the difference frequency is decreasing so that, as the region of discriminator response is first reached discriminator 14 puts forth a negative output which is effective to even further decrease the oscillator frequency. As the decreasing oscillator frequency tends to pass through $f_2$, the discriminator output reverses to positive, and the above-described control action takes place for maintaining the oscillator frequency stabilized at $f_2$ and hence stabilizing the difference frequency at the desired value.

But, suppose the decreasing oscillator frequency should drop sufficiently below $f_2$ to avoid the immediately above described stabilizing action. Now, as the decreasing oscillator frequency passes $f_r$ and approaches $f_1$, the resultant increasing difference frequency is effective to first cause discriminator 14 to have a positive output, tending to increase, or oppose the decrease in, the oscillator frequency. When this positive discriminator output becomes sufficiently strong, as at point 131, the oscillator ceases to decrease its operating frequency, so that the oscillator frequency is prevented from going below $f_7$. If the tendency to drift is reversed, so that the oscillator frequency increases, increasing oscillator frequency then becomes stabilized at or near $f_2$, as above described.

Should the decrease in oscillator frequency continue, so that it passes below $f_8$, at the region of maximum positive output of discriminator 14, the less positive discriminator output encountered between $f_8$ and $f_1$, and the negative discriminator output encountered below $f_1$, would not interfere with and would assist such decrease.

Where the variation on oscillator frequency is caused by a scanning action, which periodically reverses the direction of frequency change, it will be seen that where the scanning starts below frequency $f_4$, the frequency can never exceed $f_3$, but will vary periodically with $f_3$ as its upper limit. In this case, the desired difference frequency $f_d$ is never reached.

When the scanning action starts above $f_2$, the oscillator will "lock-in" at $f_2$ where it first reaches that frequency, and will remain there provided the scanning action is interrupted or is otherwise ineffective to overcome the control action of discriminator 14.

When the scanning action starts between $f_8$ and $f_2$, decrease in frequency will halt at $f_7$. Subsequent reversal of the scanning action will increase the frequency to $f_2$, at which "lock-in" will again occur. In each of the latter two conditions, the desired difference frequency is reached and maintained.

Hence, in the second condition where the oscillator frequency is decreasing, from above $f_2$, or in the third condition where the frequency is between $f_2$ and $f_8$ there is no tendency for the oscillator frequency to become stabilized, except at $f_2$, which is higher than $f_r$ and separated therefrom by the desired difference frequency. It is only during the first considered condition of ascending oscillator frequency from below $f_4$ that corrective measures are required to insure reliable automatic frequency control at all times.

According to my invention, I render the output of discriminator 14 inoperable to prevent the increasing oscillator frequency from increasing above frequency $f_3$. This is accomplished, in the preferred embodiment of the invention, by providing auxiliary discriminator 111 which is tuned to difference frequency $F_a$ representing the difference frequency between oscillator frequencies $f_r$ and $f_4$, and may have the same characteristics as main discriminator 14.

Whenever the frequency of oscillator 11 goes below $f_4$ and the difference frequency is within the range of auxiliary discriminator 111, the output of auxiliary discriminator 111 is negative, and this causes grid 112 to become more negative. As a result, the current through resistor 116 drops, the potential on lead 117 becomes more negative and triode 119, which is suitably biased, is rendered non-conductive. This insures that main discriminator 14 has no control over the scanning action when the output of discriminator 111 is negative, and lock-in when the oscillator frequency is below $f_4$ is prevented.

When the frequency of oscillator 11 is above $f_4$ and the difference frequency is within the range of auxiliary discriminator 111 the output of auxiliary discriminator 111 is positive. Due to resistor 110 this positive output has little or no effect in varying the output of triode 113 which remains substantially at the zero input condition. The same is true when auxiliary discriminator 111 has no output. In both of these cases, no control effect is exerted by auxiliary discriminator 111 on triode 119, (that is, triode 119 is permitted to amplify) and main discriminator 14 is allowed to assume its above explained command over the control circuit 15.

Auxiliary discriminator 111 therefore renders frequency control of oscillator 11 by main discriminator 14 ineffective in the critical region where there is danger of the oscillator frequency becoming substantially stabilized at a frequency other than that which will produce the desired difference frequency. This is indicated as shaded in Figure 20. Discriminator 111, triode 113 and lead 117 thereby effectively valve the control action of discriminator 14, specifically rendering it ineffective when the oscillator frequency is below $f_4$.

In order to prevent the undesired lock-in at $f_7$ discussed above, when scanning is not used, the characteristic of discriminator 111 may be modified by suitable auxiliary circuit elements, to have the form shown by the dash-dot line 132, which produces zero output at the frequency $f_8$. In this way, triode 113 blocks the tuning control between frequencies $f_8$ and $f_r$ also, so that no desired lock-in at $f_7$ can occur.

Figure 21 illustrates a further embodiment of the invention similar to that of Figure 18 but wherein the output of the main discriminator is controlled by a suitable tuned circuit arrangement to prevent lock-in at an undesired frequency. The auxiliary discriminator 111 and control tube 113 and its circuit are omitted in Fig. 21, being replaced by the apparatus of Fig. 21 connected between leads 100 and 117.

The output of intermediate frequency amplifier 12 is connected by lead 100 to a tuned circuit comprising coupled primary and secondary coils 133 and 134 having parallel condensers 135 and 136 respectively. The secondary output passes through a suitable rectifier 137 and is connected by lead 138 to the grid of triode 119. The remainder of the system of Fig. 21, although not shown in detail in Fig. 21, is the same as Figure 18.

Secondary 134, 136 has such a resonant frequency that it delivers an appreciable output only when the frequency of oscillator 11 is below $f_4$ and in the range indicated by shading in Figure 20. Rectifier 137 passes only the negative part of the output of secondary 134, 136. Thus, triode 119 being biased to be cut off when grid 118 is made more negative, the tuned circuit valves the control action of main discriminator 14.

I have described above two frequency sensitive arrangements for blocking control action of main discriminator 14 for preventing undesired lock-in of the oscillator frequency. Any equivalent arrangement for accomplishing this purpose is within the scope of the invention.

The auxiliary discriminator and tuned circuit controls above described and illustrated in Figures 18 and 21 may be equally well applied to any automatic frequency control system, as for example where no scanning control circuit 15 is employed and the output of discriminator 14 is directly connected to the frequency regulating means of oscillator 11.

The invention illustrated in Figures 18–21 is of course not limited to the multivibrator type scanning control circuits earlier described in the application, but may comprise any suitable scanning control.

Either or both of the above assumptions as to polarity of discriminator output or direction of response of the controlled oscillator frequency to the positive or negative discriminator output may be reversed without essentially changing the above described operation. When the polarity of discriminator output is reversed, however, frequency stabilization takes place with the oscillator frequency at $f_1$. This is a manner of selecting a desired sequential order between the reference and oscillator frequencies.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Automatic frequency control apparatus for a variable frequency device comprising variably energizable tuning means for said device, means for positively cyclically varying energization of said tuning means for positively cyclically varying the operating frequency of said device over a predetermined band, means producing a signal corresponding in magnitude and in sense to variation of said operating frequency from a desired frequency condition, and means responsive to said signal for both controlling said cyclical variation and maintaining said operating frequency substantially at said desired frequency condition.

2. Automatic frequency control apparatus for a variable frequency device comprising reversible control means for cyclically varying the operating frequency of said device, means for producing a signal representing variation of said operating frequency from a desired frequency condition, said signal comprising a succession of electrical pulses, and means introducing said signal into said control means for modifying said cyclic operation, said pulses serving to cause reversal of said control means with changes in polarity of said signal.

3. Automatic frequency control apparatus for a high frequency device comprising means for cyclically varying the operating frequency of said device over a predetermined frequency band, means for producing a signal having polarity and magnitude respectively representing the sense and magnitude of variation of said operating frequency from a desired frequency condition, and means responsive to successive alternations of the polarity of said signal for both controlling said cyclical variation and maintaining said operating frequency substantially at said desired frequency condition.

4. The apparatus defined in claim 3, including means combining the outputs of said signal responsive means and said frequency varying means for exercising said frequency control.

5. The automatic frequency control apparatus defined in claim 3, wherein said signal is pulsed.

6. Automatic frequency control apparatus for substantially maintaining a desired frequency difference between two high frequency sources comprising vacuum-tube oscillator means for cyclically varying the operating frequency of one of said sources to repeatedly scan a predetermined frequency band, means producing a control signal representing departure from said desired frequency difference, and means responsive to change of polarity of said control signal for reversing said cyclical variation and for maintaining said desired frequency difference.

7. Apparatus for automatically maintaining a high frequency device at or near a desired frequency comprising means for tuning said apparatus, multivibrator means connected for controlling said tuning means for cyclically varying the operating frequency of said device over a predetermined frequency range, and means responsive to the output frequency of said device for reversing the frequency control action of said multivibrator means to maintain said output frequency near or at said desired frequency.

8. Automatic frequency control apparatus for a high frequency device comprising means for tuning said device, scanning control means having a cyclically varying output, means for producing a control signal having variable magnitude and reversible polarity respectively representing deviation in magnitude and sense of the operating frequency of said device from a desired frequency, and means jointly responsive to said control signal and said cyclically varying output for maintaining said operating frequency substantially at said desired frequency.

9. In automatic frequency control apparatus for a velocity modulation device wherein an electron beam is projected through an ultra high frequency resonator field and returned therethrough by a reflector electrode, electro-mechanical tuning means for said resonator, electrical tuning means for said resonator embodying means for varying the potential of said reflector electrode, a source of electrical energy including a frequency discriminator and a multivibrator connected to produce a reversible cyclically varying output, and means connecting said cyclically varying output through long and short time constant circuits for energizing said electro-mechanical and electrical tuning means respectively.

10. An indicating system embodying a receiver for pulses of ultra high frequency energy, a local oscillator having an ultra high frequency output, means for mixing said receiver and local oscillator outputs for obtaining a desired difference frequency, and means for automatically maintaining said difference frequency at or near a desired value comprising means including a multivibrator for cyclically varying the operating frequency of said local oscillator over a predetermined frequency band, and means responsive to variation of said difference frequency through said desired frequency for reversing said multivibrator.

11. Automatic frequency control apparatus for maintaining a substantially fixed frequency difference between two high frequency sources comprising discriminator means responsive to said frequency difference and providing an output proportional to and sensed in accordance with deviation of said frequency difference from said fixed value, scanning means having a cyclically varying output, and tuning means for one of said sources jointly responsive to said outputs.

12. Automatic frequency control apparatus for a variable frequency device comprising reversible control means for cyclically varying the operating frequency of said device, means for producing a signal having a sense representing the direction of variation of said operating frequency from a desired frequency condition, and means introducing said signal into said control means for modifying said cyclical operation, said signal serving to cause reversal of said control means with changes in polarity of said signal.

13. Automatic frequency control apparatus comprising a source of continuous electromagnetic wave energy, heterodyning means connected to said source for producing a difference frequency to be controlled, means for pulsing said difference frequency, and means including a frequency discriminator and a multivibrator connected to produce a reversible-polarity variable-magnitude control signal in accordance with deviations of said difference frequency from a desired frequency value and for controlling the output frequency of said heterodyning means whereby said difference frequency is transformed to and maintained substantially at said desired frequency value.

14. Automatic frequency control apparatus for a frequency-variable device comprising frequency regulation means, scanning means having a variable output voltage oscillating at a predetermined period for cyclically actuating said frequency regulation means to vary the frequency of said device through a predetermined band, means responsive to departure of said device frequency from a desired frequency condition for providing a reversible-polarity control signal for controlling said frequency regulation means, and means responsive to successive alternations of the polarity of said control signal for substantially decreasing the period of said variable output voltage and of said cyclic frequency variation of said device.

15. Automatic frequency control apparatus for maintaining a desired frequency difference between two sources of high frequency electromagnetic energy comprising means for cyclically varying the operating frequency of one of said sources to repeatedly scan a predetermined frequency band, means producing a control signal representing departure from said desired frequency difference, and means responsive to change of polarity of said control signal for reversing said cyclical variation and for substantially maintaining said desired frequency difference.

16. Apparatus for automatically maintaining a high frequency device substantially at a desired frequency comprising means for tuning said apparatus, means connected for controlling said tuning means for cyclically varying the operating frequency of said device over a predetermined frequency range, and means responsive to the output frequency of said device for reversing the frequency control action of said control means to maintain said output frequency substantially at said desired frequency.

17. High frequency apparatus comprising a receiver for high frequency electromagnetic wave energy, a local oscillator, means for mixing the outputs of said receiver and said local oscillator for obtaining a desired difference frequency, means for automatically maintaining said difference frequency substantially at a desired value comprising a multivibrator for cyclically varying the operating frequency of said local oscillator and means responsive to variation of said difference frequency through said desired frequency for reversing the polarity of said multivibrator.

18. Automatic frequency control apparatus comprising a high frequency device whose frequency is to be controlled, means for deriving a signal corresponding to deviation of the frequency of said device from a desired value, and means for controlling the frequency of said device, said last-named means comprising an oscillator adapted to produce an output of a given frequency, an integrating circuit for integrating said output, said circuit having a time constant at least of the order of magnitude of the period of said oscillator output, means coupling said circuit to said device to control the frequency thereof by said integrating output, whereby said control frequency is cyclically varied, and means responsive to said signal for materially increasing said oscillator frequency whereby said integrated output is maintained substantially constant to keep said controlled frequency substantially at said desired frequency.

EDWARD L. GINZTON.

REFERENCES CITED

The following references are of record in the file of this patent:

UNITED STATES PATENTS

| Number | Name | Date |
|---|---|---|
| 1,847,160 | Affel | Mar. 1, 1932 |
| 1,934,400 | Bollman | Nov. 7, 1933 |
| 2,012,603 | Fuchs | Aug. 27, 1935 |
| 2,098,331 | Bowman | Nov. 9, 1937 |
| 2,162,335 | Jacob | June 13, 1939 |
| 2,173,902 | Gerth | Sept. 26, 1939 |
| 2,203,750 | Sherman | June 11, 1940 |
| 2,242,249 | Varian | May 20, 1941 |
| 2,242,275 | Varian | May 20, 1941 |
| 2,245,627 | Varian | June 17, 1941 |
| 2,254,601 | Felch | Sept. 2, 1941 |
| 2,262,147 | Owsley | Nov. 11, 1941 |
| 2,284,266 | Bellescize | May 26, 1942 |
| 2,287,925 | White | June 30, 1942 |
| 2,294,942 | Varian | Sept. 8, 1942 |
| 2,311,658 | Hansen | Feb. 23, 1943 |
| 2,326,737 | Andrews | Aug. 17, 1943 |
| 2,404,568 | Dow | July 23, 1946 |

Certificate of Correction

Patent No. 2,434,294.  January 13, 1948.

EDWARD L. GINZTON

It is hereby certified that error appears in the printed specification of the above numbered patent requiring correction as follows: Column 7, line 55, for "scanning" read *spacing*; and that the said Letters Patent should be read with this correction therein that the same may conform to the record of the case in the Patent Office.

Signed and sealed this 4th day of May, A. D. 1948.

[SEAL]

THOMAS F. MURPHY,
*Assistant Commissioner of Patents.*